US008626702B2

(12) United States Patent
Schlueter et al.

(10) Patent No.: US 8,626,702 B2
(45) Date of Patent: Jan. 7, 2014

(54) METHOD AND SYSTEM FOR VALIDATION OF DATA EXTRACTION

(75) Inventors: Markus Schlueter, Rauenberg (DE); Peter Karlheinz Zimmerer, Walldorf (DE); Harald Fey, Illingen (DE)

(73) Assignee: SAP AG, Walldorf (DE)

( * ) Notice: Subject to any disclaimer, the term of this patent is extended or adjusted under 35 U.S.C. 154(b) by 1710 days.

(21) Appl. No.: 11/646,194

(22) Filed: Dec. 27, 2006

(65) Prior Publication Data

US 2008/0162999 A1 Jul. 3, 2008

(51) Int. Cl.
*G06F 17/30* (2006.01)
(52) U.S. Cl.
USPC .......................................... 707/600; 709/238
(58) Field of Classification Search
USPC .................... 707/2, 6, 600; 709/238
See application file for complete search history.

(56) References Cited

U.S. PATENT DOCUMENTS

| 6,853,994 | B1* | 2/2005 | Gupta | 707/6 |
| 7,203,671 | B1* | 4/2007 | Wong | 707/2 |
| 7,321,939 | B1* | 1/2008 | Porter | 709/238 |
| 2007/0174236 | A1* | 7/2007 | Pagnussat et al. | 707/2 |

* cited by examiner

*Primary Examiner* — Huawen Peng
(74) *Attorney, Agent, or Firm* — Brake Hughes Bellermann LLP

(57) ABSTRACT

Validation of an extraction process from an operation system to an on-line analytics and processing ("OLAP") system may be achieved utilizing a function module that reads data from a queue and outputs the data in a structured form. A second function module may be used to perform an existence and uniqueness check on the data to determine the existence and/or uniqueness of various data elements.

20 Claims, 8 Drawing Sheets

METHOD AND SYSTEM FOR VALIDATION OF DATA EXTRACTION

TECHNICAL FIELD

This description relates to computer software. In particular, this description relates to a method and system for automatic validation of data extracted from an operational system.

BACKGROUND

Modern businesses rely upon a myriad of operational systems that generate data. Examples of operational systems may include order generation systems, invoicing systems, billing systems and accounting systems. It is often desirable to move data generated by an operational system for later analysis. For example, it may be desirable to move data for transactions generated in a transaction system into a system where the data can be analyzed. At some later point in time, this data may be analyzed to examine customer trends, preferences, revenue generated by category, or other relevant information. Data visualization tools such as charting and plotting may be employed to provide additional insight into the content of the data. Systems that are utilized to analyze and evaluate data generated from operational systems are often referred to as OLAP ("Online Analytical Processing") systems, business warehouse ("BW") systems and/or business intelligence ("BI") systems.

The process of performing the transfer of data from an operational system to an OLAP or BW system is often referred to as an extraction process. The term "extraction" describes the concept of retrieving data from an operational system and causing the storage of the extracted data in an OLAP or BW system. An extraction system may be deployed which, upon the generation of data in an operational system, automatically transfers the generated data from an operational system to the OLAP system. The extraction process may also perform some rudimentary transformations on the data before it is stored in the OLAP system, in order that, for example, the data is in a format suitable for processing and storage by an OLAP system. An extraction system may be part of an operational system such as a framework implemented within an operational system, or may be a separate system.

An extraction system may include a software system that operates in tandem with an operational system to perform extraction of data generated by an operational system. As just referenced, an extraction system may be a separate system from the operational system, or may be combined with the operational system. Typically, an extraction system may include management functions for defining such parameters, such as which operational systems is to be the subject of the data extraction, which data should be extracted, and how often the data extraction process should be performed.

An extraction process may perform a number of evaluations or transformations on the data generated by an operational system. The terms transformation and evaluation refer to the fact that the extraction system may process the data generated by the operational system so that it can be stored in the BW system in a convenient format. These transformations may include such processing as aggregating, combining, simplifying, filtering, conversion and any other processing of the underlying data.

Evaluations or transformation of data extracted from an operational system is often necessitated by the types of analysis that will be later performed on the data stored in an OLAP system. Often, for example, it will be desirable to analyze data in an OLAP system by querying the OLAP system utilizing any number of convenient parameters. For example, it may be desirable to examine all sales orders generated for the month of July. However, the data generated by the operational system, although it may indicate the month of the sales order, may not include a data item that aggregates all data by month. Thus, it may be convenient to store sales data in a BW system that is aggregated by month.

Although it might appear to be a relatively straightforward task to extract data generated by an operational system to a business warehouse system, there are a number of problems that may arise. The mapping between data structures in an operational system and an OLAP system is a natural source of errors because the mapping has to be defined explicitly. Due to the evaluation process described above, many errors may occur when data is transformed and stored in an OLAP system. Data generated by an operational system is often generated in a complex structured format that must be correctly interpreted by an extraction process. Errors may arise in correctly interpreting the format of the data as well as insuring that the data arrives in pristine form in the BW system. Two example types of errors that may arise are the failure to transfer a data item from an operational system to an OLAP system and generation of duplicate or redundant copies of a particular data item in an OLAP system. A third type of error relates to the accuracy or correctness for which data is replicated from an operational system in an OLAP system.

These three types of errors that may occur in data extraction from an operational system to an OLAP system may thus be characterized as concerning existence, uniqueness and correctness. With an existence error, a data element generated by an operational system is simply not transferred to an OLAP system (i.e., it fails to exist in the OLAP system). With a uniqueness error, data may be replicated or duplicated erroneously in an OLAP system (i.e., multiple copies of the same data element may be stored in the OLAP system). With a correctness error, a data element is stored in an OLAP system erroneously (i.e., the data element has been mutated from its original form or content). Still another type of error that may occur to data that is not intended to be extracted from an operational system that is, in fact, extracted.

Thus, there is a possibility for errors in the operation of extraction systems and/or processes, and such problems may be exacerbated by the heterogeneous nature of data generated by many operational systems, as well as the heterogeneous nature of format of extracted data itself. Consequently, a utility of such extraction systems may be reduced, and some benefits of the available data may be reduced or lost, as well.

SUMMARY

According to one general aspect a system for validating a data extraction process from an operational system to an OLAP system comprises a queue configured to store extracted data that the extraction process has extracted from the operational system, wherein the extracted data in the queue is stored based upon an associated data source, and a processor that is adapted to determine at least one queue based upon a received data source, read first data from the at least one queue as a function of at least a portion of the selected data source to generate a structured data element that is based upon the selected data source, receive at least one identifier associated with the first data for validation of the structured data element, determine at least one of an existence and uniqueness of each of the at least one identifier in the structured data element, and report a validation result for the structured data element, based upon the existence and uniqueness determination.

According to another general aspect a method for validating an extraction process from an operational system to an OLAP system includes determining at least one queue associated with a received data source, reading first data from the at least one a queue as a function of at least a portion of the selected data source to generate a structured data element that is based upon the selected data source, receiving at least one identifier associated with the first data for validation of the structured data element, determining at least one of an existence and uniqueness of each of the at least one identifier in the structured data element, and reporting a validation result for the structured data element, based upon the existence and uniqueness determination.

According to another general aspect, a validation interface may be configured to validate an extraction process from an operational system to an OLAP system. The validation interface may include a first function module, the first function module configured to receive a first input of a data source, and configured to read data from a queue to provide an output of data in the queue in a structured form based on the data source, a second function module, the second function module configured to receive an input of the data source for the operational system and configured to provide an output of at least one queue associated with the data source, and a third function module, the third function module configured to determine at least one of an existence and a uniqueness of selected data extracted by an extraction system performing the extraction process.

The details of one or more implementations are set forth in the accompanying drawings and the description below. Other features will be apparent from the description and drawings, and from the claims.

DETAILED DESCRIPTION

Figure 1:
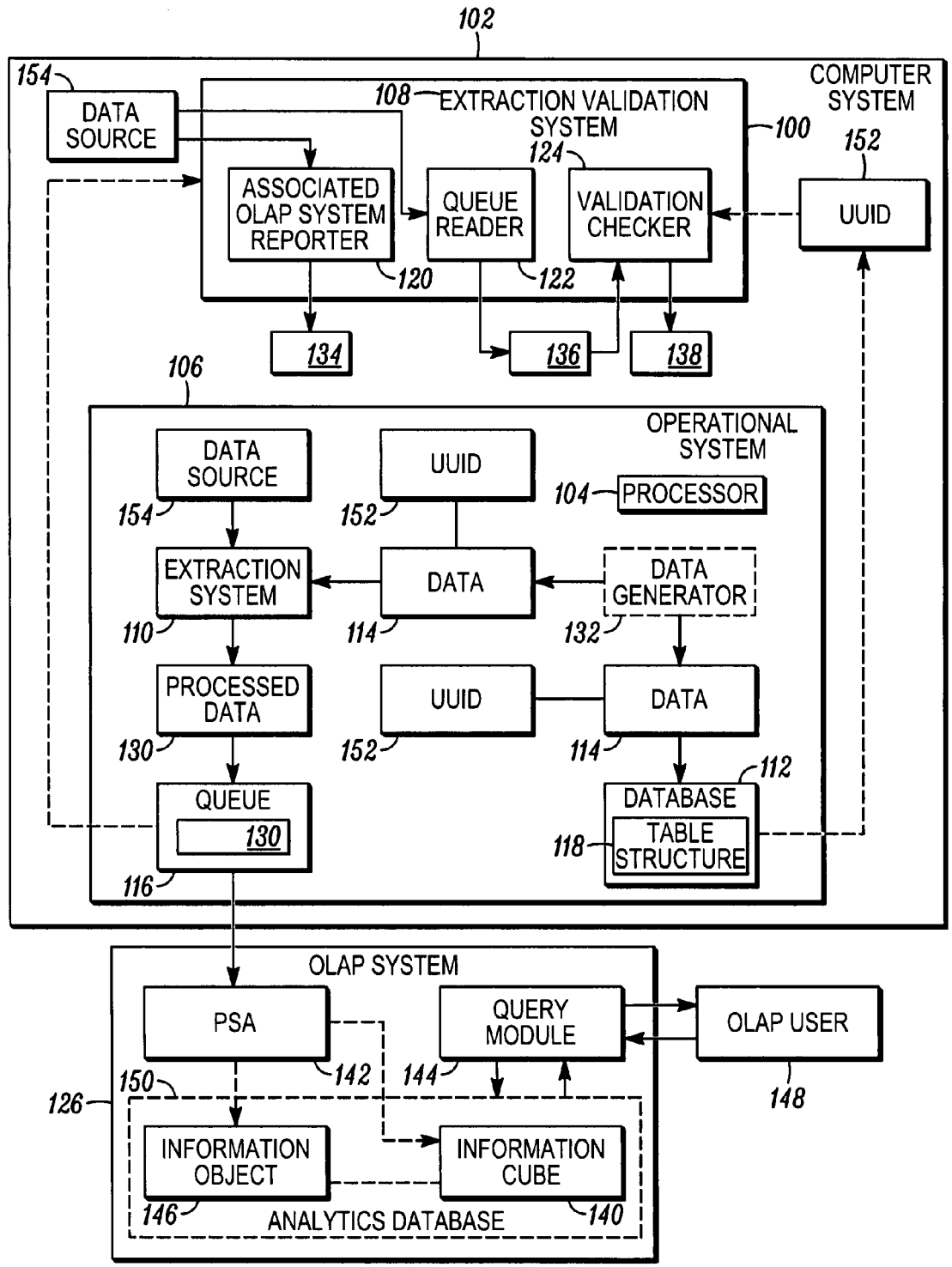
FIG. 1 is a block diagram of a system for performing an example operation of a data extraction validation system in conjunction with an operational system and an OLAP system.

FIG. 1 is a block diagram of an example operation of a data extraction validation system in conjunction with an operational system and an OLAP system. In the example of FIG. 1, a computer system 102 may include a processor 104 that executes any number of processes. The computer system 102 and the processor 104 may provide an operational system 106, an extraction validation system 108, and an extraction system 110. It should be understood that these various systems 102-110, and other elements of the various figures, may be comprised of various hardware and software elements. For example, the operational system 106 may include the hardware of the computer system 102 itself, as well as various processes executed by the processor 104 to provide functions related to the operational system 106. Although various processes may be executed on a single computer system 102 sharing a single processor 104 and memory system (not shown), it should be understood that these processes may execute on multiple computer systems and/or may be implemented using dedicated hardware. Furthermore, although the term system is used to reference these entities, it should be understood that the extraction system 110 and the extraction validation system 108 may each be a separate framework that operates within the operational system 106.

An operational system 106 may perform functions related to a business operation such as, for example, order generation, inventory management and accounting. Although FIG. 1 shows a single operational system 106, it should be understood that the computer system 102 may host any number of operational system processes 106 for performing heterogeneous business functions.

An operational system 106 may include any number of data generators 132. A data generator 132 may be any output of the operational system 106 that generates or provides data 114. Although only a single data generator 132 is shown for the operational system 106, it should be understood that an operational system 106 may include any number of data generators 132, which generate data 114.

Typically, data 114 may be organized into structured objects comprised of any number of fields or discrete elements. Thus, for example, an order generation system might include a data generator 132 that generates order record objects. The order record objects might comprise a number of data fields including an order record identifier, a date, a buyer name, or other data fields related to the particular operational system 106.

Each data element 114 may be associated with a UUID ("Universal Unique Identifier") 152 that distinguishes the data element. A UUID 152 is guaranteed or extremely likely to be different from any other generated UUID 152. Thus, for example, in the example of an order object comprised of various items, the order itself as well as the individual items comprising the order may each be associated with a respective UUID 152. Each of the UUIDs 152 will be different from each other so as to uniquely identify each item on the sales order.

The operational system 106 may cause data 114 generated by a data generator 132 to be stored in an operational system database 112. The operational system database 112 may be, for example, a relational database with a predefined table structure. The predefined table structure may correspond to the structure of data objects generated by the data generator 132. Thus, for example, in the order record object example, the database 112 may include a table structure that includes fields for an order record identifier, a data, a buyer name, or other relevant data. As shown in FIG. 1, data 114 generated by data generator 132 may be stored in the operational system database 112 along with an associated UUID 152 for the data 114.

FIG. 1 also shows an extraction system 110. An extraction system 110 may perform processes in tandem with the operational system 106 to transfer and process data 114 generated by any number of data generators 132 in an operational system 106 into a format suitable for consumption by an OLAP system 126. The extraction system 110 may comprise a framework that operates within the operational system 110. Although FIG. 1 shows that the extraction system 110 is included within the operational system 106, alternatively, it may be implemented as a separate system. The extraction system 110 may perform various evaluation and transformation functions to process data 114 generated by a data generator 132 before it is stored in an OLAP system 126. These transformations may prepare the data in a format suitable for analytic evaluation and/or storage in an OLAP system 126 and may include such functions as data aggregation, data combination, data filtering, data conversion and any other type of processing. Although as shown in FIG. 1, the extraction system 110 is shown as executing on the same processor as the operational system 106, it should be understood that an extraction system 110 may be executed on a separate processor (not shown in FIG. 1).

As shown in FIG. 1, the extraction system 110 may pull data 114 generated from a data generator 132, process and/or transform the data 114 via a data source 154 to generate processed data 130 and then cause the storage of the processed data 130 in a queue 116. The processed data 130 may be stored in a queue 116 for subsequent transformation to the OLAP system 126. The queue 116 may be a delta queue. A delta queue may be a set of tables that includes data that has changed, modified, deleted or added. The delta queue 116 may have an associated name. There may exist several delta queues 116 for an operational system that allows extraction of data in multiple OLAP systems 126.

The data source 154 may comprise a function module (not shown) and a specified extraction structure (not shown), which collectively provide for the transformation and processing of data 114 into a format suitable for reception by an OLAP system 126. An extraction structure may include, for example, any data indicating or specifying how data is to be transformed from its form as generated by the data generator 132 in an operational system 160 into processed data 130, which is to further processed and stored by the OLAP system 126. The data source 154 also may include a function module, which may utilize an associated extract structure to perform the transformation of data 114 into the processed data 130. The data source 154 may be associated with any number of OLAP systems 126. In particular, it may be desirable to store data generated by an operational system 106 in any number of separate OLAP systems 126.

An OLAP system 126 may refer to, or include, any system that may receive extracted data from the operational system 106 and/or the extraction system 110. The OLAP system 126 may include a PSA ("Persistency Staging Area") 142, queries function module 144 and an analytics database 150. Because an analytics database 150 may store data in a different format from that of an operational system database 112 due to the nature of analytics processing and analysis, the OLAP system 126 may cause the transformation of received processed data 130 into a format suitable for the OLAP system 126. For example, the PSA 142 may function to transform and package processed data 130 into a suitable format for storage in an OLAP system 126.

As shown in FIG. 1, the analytics database 150 may store any number of information objects 146 and information cubes 140. The information object 146 may include a table structure similar to the table structure of an operational system database 112. The information cube 140 may provide metadata for navigating and accessing the information object(s) 146. Thus, before the processed data 130 is stored in an analytics database 150 it may first be further processed and transformed to be in a format suitable for storage as information objects 146 and information cubes 140. Then, an OLAP user desiring to perform analysis of data stored in an analytics database 150 may provide queries to the queries system 144, which may then cause retrieval of data from the analytics database 150 and associated reporting.

FIG. 1 shows an extraction validation system 108, which performs functions for validating data extracted by the extraction system 110 from the operational system 106. The extraction validation system 108 may include any number of function modules, including, for example, an associated OLAP system reporter 120, a queue reader 122 and a validation checker 124. The nature of these function modules will be described in more detail below. However, in brief, an associated OLAP system reporter 120 may receive a data source name and provide as output 134 a list of all OLAP systems that are associated with that data source 154. A queue reader 122 receives as input a data source 154 or data source reference and provides as output structured data 136, which includes data read from a queue 116 corresponding to that data source 154. A validation checker 124 receives as input the structured data 136 and at least one UUID 152, as shown, and provides as output a validation result 138, which indicates at least one of the uniqueness or existence in the queue 116 of each UUID specified.

According to an example embodiment, the extraction validation system 108 may be used to test artificial data for the operational system 106. In this example scenario an appropriate stimulus is applied to cause the operational system 106 to generate data 114 having predetermined content. Artificial data will be generated as a result and stored in a queue 116 as outlined above. The extraction validation system 108 may then be activated to check the validity of the artificial data.

Figure 2:
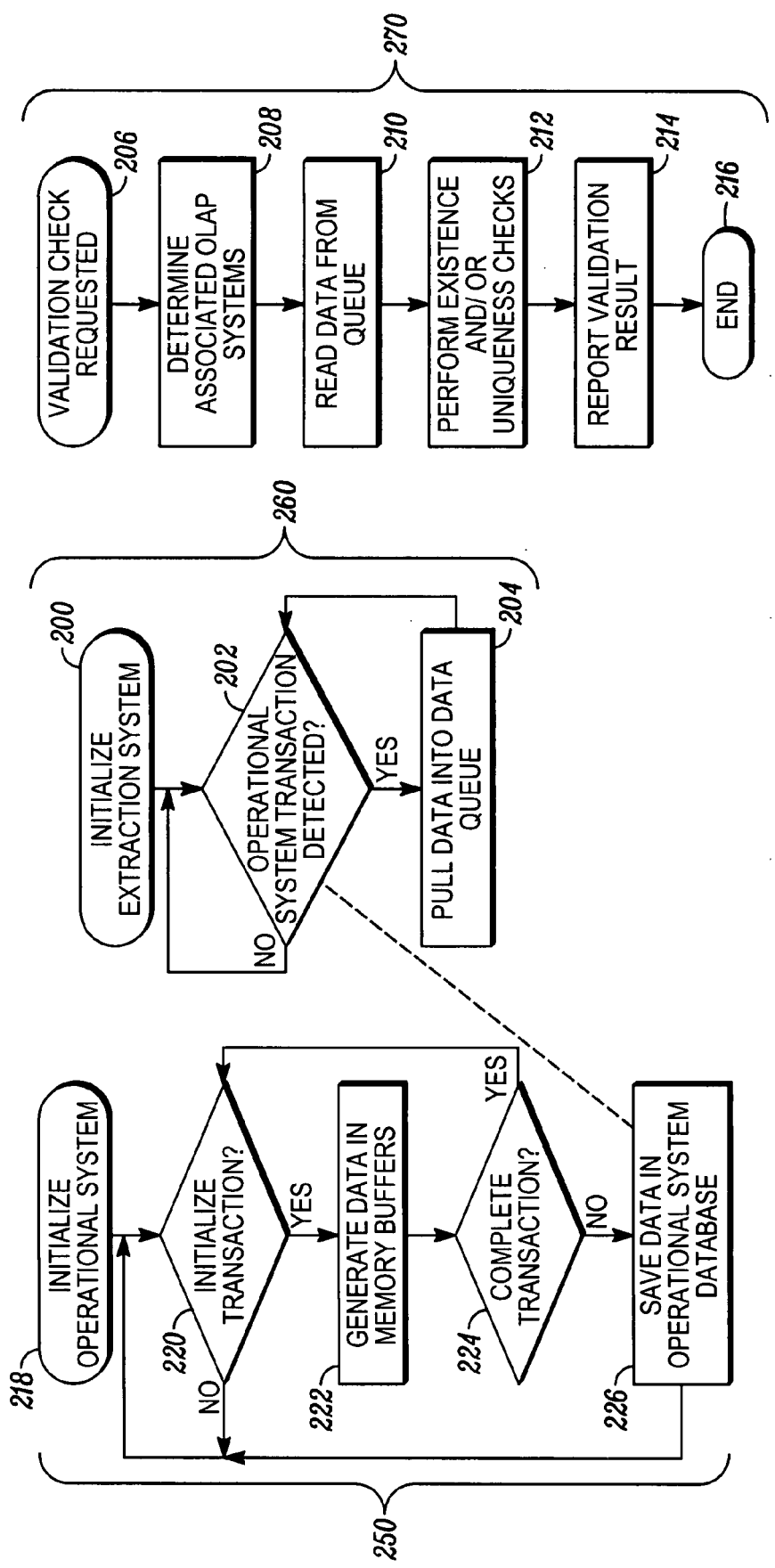
FIG. 2 is a flowchart depicting the tandem efforts of an operational system and an extraction system in relation to an extraction validation system.

According to another example embodiment, the extraction validation system 108 may be utilized in real time to validate the extraction of data within a productive environment generated by an operational system 106. FIG. 2 is a flowchart depicting the tandem efforts of the operational system 106 and the extraction system 110 in relation to the extraction validation system 108. Processes 250, 260 and 270 may be performed by the operational system 106, the extraction system 110 and the extraction validation system 108, respectively.

With respect to process 250 performed by the operational system 106, the operational system 106 is initialized in step 218. A transaction may be initialized in step 220. An initialization of a transaction may be signalled by a user's interaction with the operational system 106 to generate some data. For example, a user may desire to create a sales order, which would comprise a transaction initialization.

If no transaction is initialized ("No" branch of step 220) flow continues with step 220 and the detection step is repeated. If a transaction is signalled ('Yes' branch of step 220), flow continues with step 222 and appropriate data is generated by a data generator 132. This generated data may be stored in an internal memory buffer, for example, on the computer system 102. Flow then continues with step 224, where a signal is detected pertaining to the completion of the transaction. If a user desires to abandon the transaction ("No" branch of step 224), flow continues with step 220 and the initialization step is detected again. Although not shown in process 222, the operational system 106 may also perform some memory cleanup of the data generated in buffers during step 222.

If a user desires to complete the transaction, for example by instructing the computer system 102 to save the generated data ('Yes' branch of step 224), flow continues with step 226 and the generated data is stored in an operational system database 112.

An extraction system 110 may operate concurrently with an operational system 106. A process associated with an extraction system is shown by 260. The extraction system is initiated in step 200. In step 202, it is determined whether the operational system 106 associated with the extraction process has generated a transaction. A transaction may be signalled, for example, by a user's interaction with the operational system 106, or generation of some data records and the user's selection to save the data, which may then typically be stored in an operational database 112. According to an example embodiment, an extraction system 110 may subscribe to event notifications from an operational system 106. If no operational system transaction is detected ('No' branch of step 202), flow continues with step 202 and the detection step is repeated. If, on the other hand, a transaction is signalled, step 204 is performed and the data generated in the transaction is pulled from a data generator 132 that generated the data and stored in a data queue 116.

Process 270 shows various steps that may be executed by an extraction validation system. An extraction validation system 108 may operate concurrently with an operational system 106 and an extraction system 110. The process is initiated in step 206 when a validation check is requested. According to an example embodiment the extraction validation system 108 may periodically perform validation checks on data generated by the operational system 106. Or, a validation check may be manually initiated by a human operator at discrete points in time.

In step 208, a determination of OLAP systems associated with a particular data source 154 is performed. This determination may be performed by the associated OLAP system reporter 120 in extraction validation system 108 shown in FIG. 1. As noted above, an associated OLAP system reporter function 120 receives a data source 154 or data source reference as an input and generates a list of associated OLAP systems as output 134.

In step 210, data to be validated is read from the queue 116 in the operational system 106 and a data structure is generated which includes the data from the queue 116 in a structured format. According to one embodiment, the queue reading and generation of structured data may be performed by a queue reader function module 122 in an extraction validation system 108. Thus, a queue reader function module 122 will receive a data source 154 or data source reference as an input and automatically generate structured data 136 as output. The structured data 136 may be generated from data stored in the queue 116 utilizing a function module and an extraction structure specified for a data source 154.

In step 212, existence and uniqueness checks are performed on one or more data items. According to an example embodiment, existence and uniqueness checks may be performed by a validation checker 124 in the extraction validation system 108. Thus, one or more UUIDs 152 may be provided to the validation checker 124. The validation checker 124 may then operate on the structured data 136 generated by the queue reader 136 to determine the existence and/or uniqueness of various data items, which were stored in the queue 116. In addition, the existence and uniqueness checks may also determine UUIDs that should not have been extracted, that is documents that should not be found in the queue.

Figure 3:
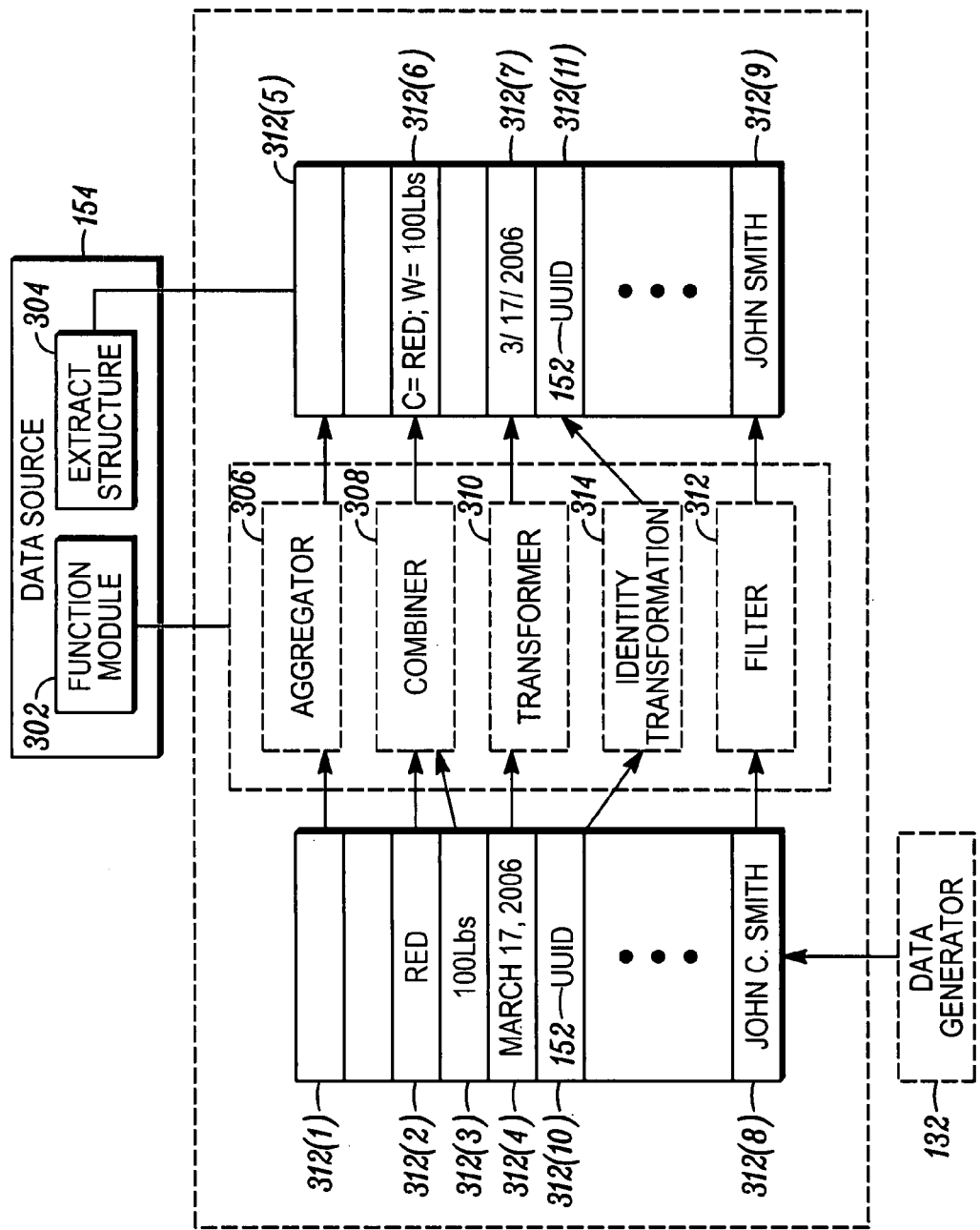
FIG. 3 shows the structure of a data source according to an example embodiment.

FIG. 3 shows the structure of a data source according to an example embodiment. A data source 154 may include a function module 302 and an extract structure 304. The function module 302 and extract structure 304 may specify how data generated by the data generator 132 in the operational system 106 is to be transformed for extraction for storage in the queue 116. As shown in FIG. 3, the data generator 132 may generate data in a structured format that includes a number of fields (e.g., 312(1), 312(2), 312(3) and 312(4)). It may be desired to transform the data into a format specified by an extract structure 304. Thus, the extract structure specifies a number of fields (e.g., 312(5), 312(6) and 312(7)). The relationship between fields specified in an extract structure 304 and the fields of structured data generated by a data generator 132 may be defined utilizing any arbitrary transformation rules, which may be implemented by the function module 302 in data source 154. For example, FIG. 3 shows four generic transformations that may be carried out by a function module 302. For example, the reading out of the queue may work within the agent framework provided by SAP.

In particular, aggregator 306 performs aggregation of data in field 312(1) from data generator 132 into field 312(5) in extract structure 304. Aggregated data may represent the cumulative sum of various data elements. For example, if field 312(1) stored items for a particular sales order, aggregated data stored in field 312(5) of the extract structure 304 might store the cumulative sum of the value of items for an entire sales order.

Combiner 306 may combine the contents of various fields generated by a data generator 132 into a single field. Thus, a shown in FIG. 3, fields 312(2) and 312(3) are combined in a single field 312(6) in the extract structure 304. An example of a combiner function might be where two attributes for an element such as color and weight represented in two fields may be combined in a single entity using a codeword.

Transformer 310 may operate to process or manipulate data in one or more fields associated with a data generator for storage in one or more fields in the extract structure 304. Thus, as shown in FIG. 3, a date field 312(4) from data generator is transformed into a new format in date field 312(7) of extract structure 304

Identity transformation 314 copies the exact structure of a field from data generator 132 in a field in extract structure 304. Thus, the identity transformation ensures a one-to-one correspondence between fields from the data generator 132 and the extract structure 304. Thus, as shown in FIG. 3, UUID 152 in field 312(10) is identically replicated in field 312(11) of the extract structure 304. The identity transformation 314 thus ensures the preservation of UUIDs during transformation operations.

Finally, filter 312 may filter various information in one or more fields from a data generator 132 as transformed into a field in an extract structure 304. Thus, as shown in FIG. 3, a name field 318(8) from an data generator 304 is filtered to produce a name field in the extract structure 312(9) (i.e., the middle initial "C" is removed).

Figure 4A:
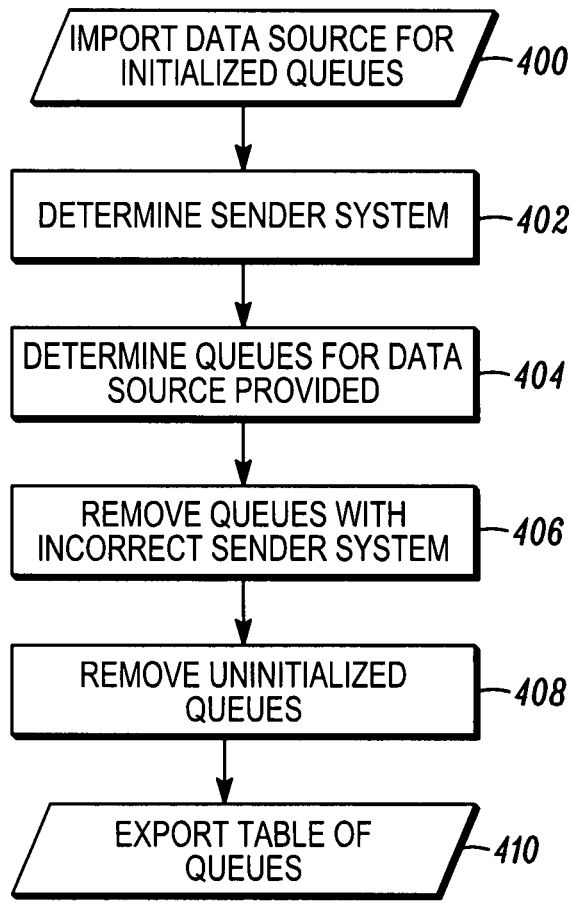
FIG. 4a is a flowchart of a process executed by an OLAP system reporter function module according to an example embodiment.

FIG. 4a is a flowchart of a process executed by the OLAP system reporter function module 120 according to one embodiment. A function module 120 may be a method or programming module or other programming unit. As described above, an OLAP system reporter function module 120 receives a data source 154 as input and generates a list 134 of OLAP systems 126 associated with the data source 154. The process may be initiated when a data source 154 is received (400). A sender operational system of the data may be determined (402), such as the operational system 106. Delta queues 116 associated with the provided data source 154 may then be determined (404) (i.e., the name of the delta queues 116), where there may be a plurality of queues associated with a given data source. Steps 406 and 408 relate to validating the correctness of delta queues for the data source 154. For example, queues that are associated with a sender system not in focus for validation may be removed (406), and queues which are not initialized may be removed (408). Then, a table of queues may be exported (410).

Figure 4B:
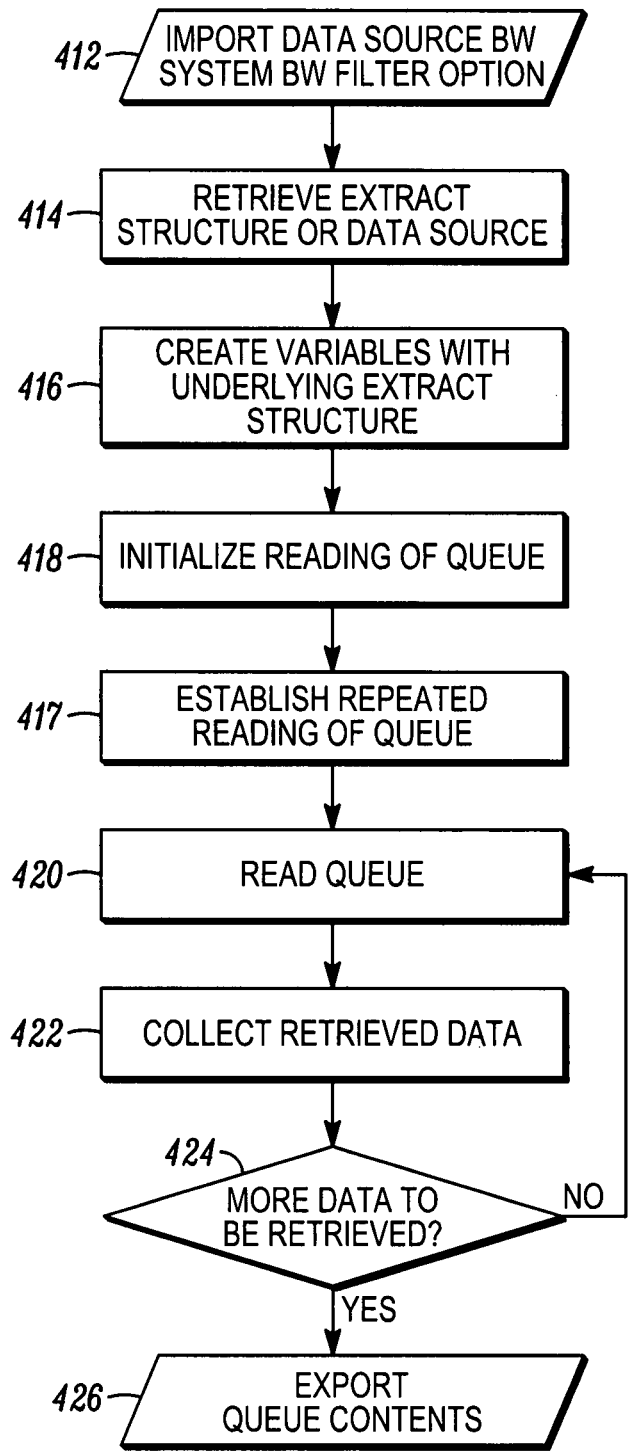
FIG. 4b is a flowchart of a process executed by a queue reader function module according to an example embodiment.

FIG. 4b is a flowchart of a process executed by a queue reader function module according to one embodiment. The process may effect a pure package-wise reading of the queue without causing a real data extraction into the OLAP system. The package-wise (i.e., a certain number of records are read) reading of the delta queue may require the calling of the package-wise function module in a specific mode, which allows reading of the delta queue multiple times within a session. As described above, the queue reader function module 122 receives a data source 154 and list 134 of OLAP systems 126 as input and generates structured data 136 corresponding to data in the queue 116. Thus, in the example of FIG. 4b, a data source, BW system and a BW filter option may be imported (412). The extract structure for the received data source 154 may be determined (414). Variables may be created that correspond to the extract structure (416), and the reading of the queue may be initialized (418). The multiple reading of the queue is established (417). This step may be necessary because an existing extraction framework might prohibit the multiple reading of a delta queue within a single session. Then, the queue may be read (420) without changing the state of the queue and data read from the queue may be collected (422). If any data remains to be read (424), flow continues with reading the queue (420); otherwise, the contents of the delta queue that were read may be exported (426).

Figure 4C:
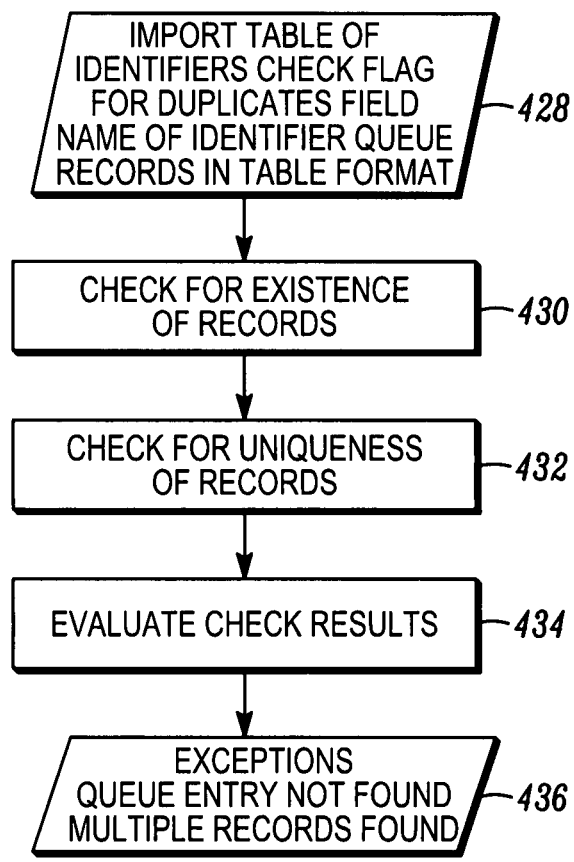
FIG. 4c is a flowchart of a process executed by a validation check function module according to an example embodiment.

FIG. 4c is a flowchart of a process executed by a validation checker according to an example embodiment. The process is initiated when a table of identifiers, a check flag for duplicates, a field name of an identifier, and a table of delta queue records are received (428). The existence of the table of identifiers may then be determined for the table data (430). Uniqueness of the identifiers provided also may be determined in the table (432). Results may then be checked for accuracy, and any exceptions are indicated (436), e.g., non-uniqueness or non-existence of identifiers.

Figure 5:
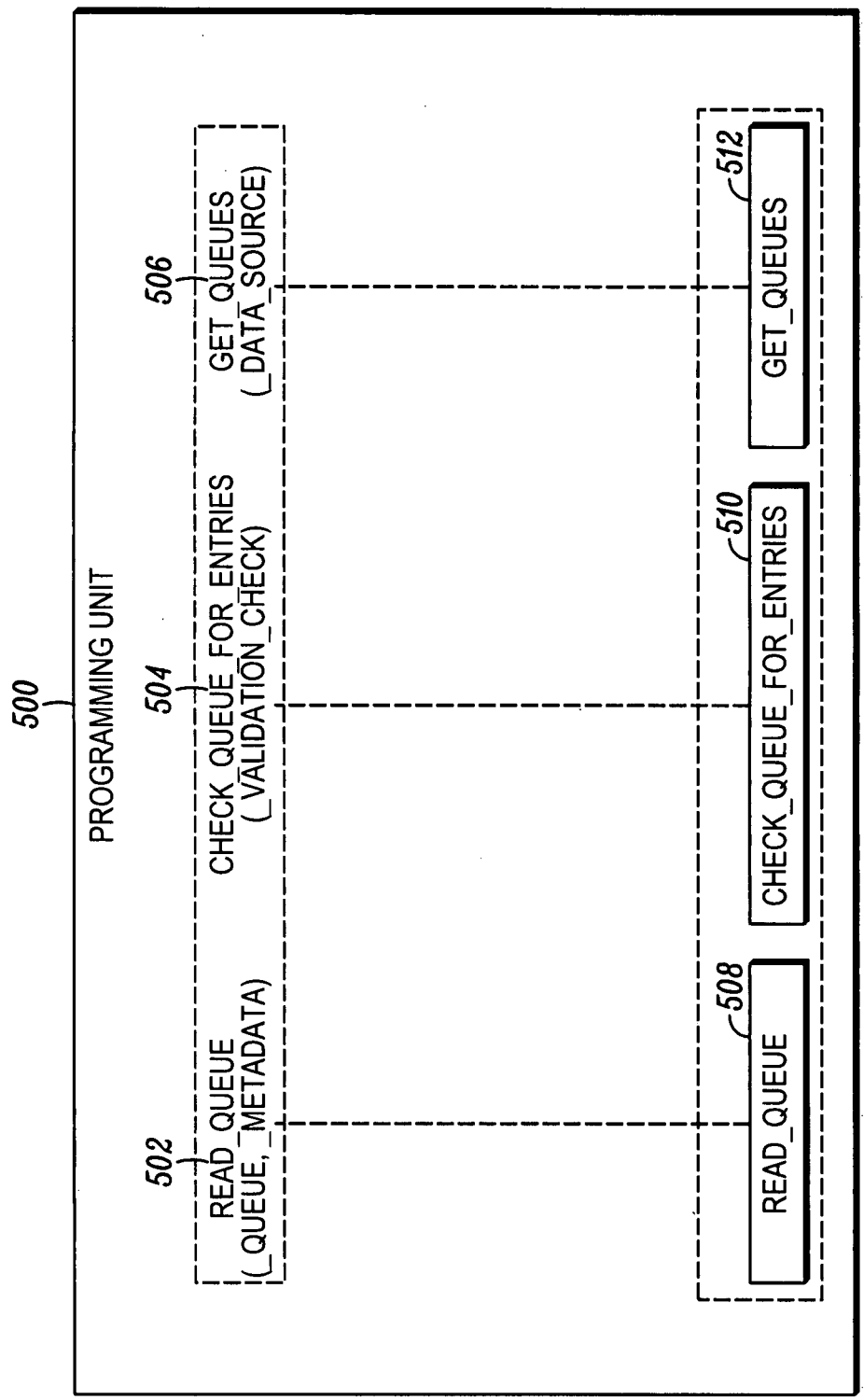
FIG. 5 is a block diagram depicting a programming unit including an interface for interacting with an extraction validation system according to an example embodiment.

FIG. 5 is a block diagram depicting a programming unit including an interface for interacting with and/or implementing an extraction validation system according to an example embodiment. As described above, the extraction validation system 108 performs functions for validating data extracted by the extraction system 110 from the operational system 106. A programming unit 500 may include or specify various interfaces and respective associated function modules.

As referenced above, the OLAP system reporter 120 may receive a data source name and provide as output 134 a list of all OLAP systems that are associated with that data source 154. A queue reader 122 receives as input a data source 154 or data source reference and provides as output structured data 136, which includes data read from a queue 116 corresponding to that data source 154. A validation checker 124 receives as input at least one UUID and provides as output a validation result 138, which indicates at least one of the uniqueness or existence in a queue 116 of each UUID specified.

The following interfaces and associated function modules may be provided by the programming unit 500 to provide access to the OLAP system reporter 120, the queue reader 122 and the validation checker 124 respectively:

GET_QUEUES(_data_source)---GET_QUEUES
READ_QUEUE(_data_source) ---READ_QUEUE

-continued

CHECK_QUEUE_FOR_ENTRIES(_data_source)----
CHECK_QUEUE_FOR_ENTRIES

Figure 6:
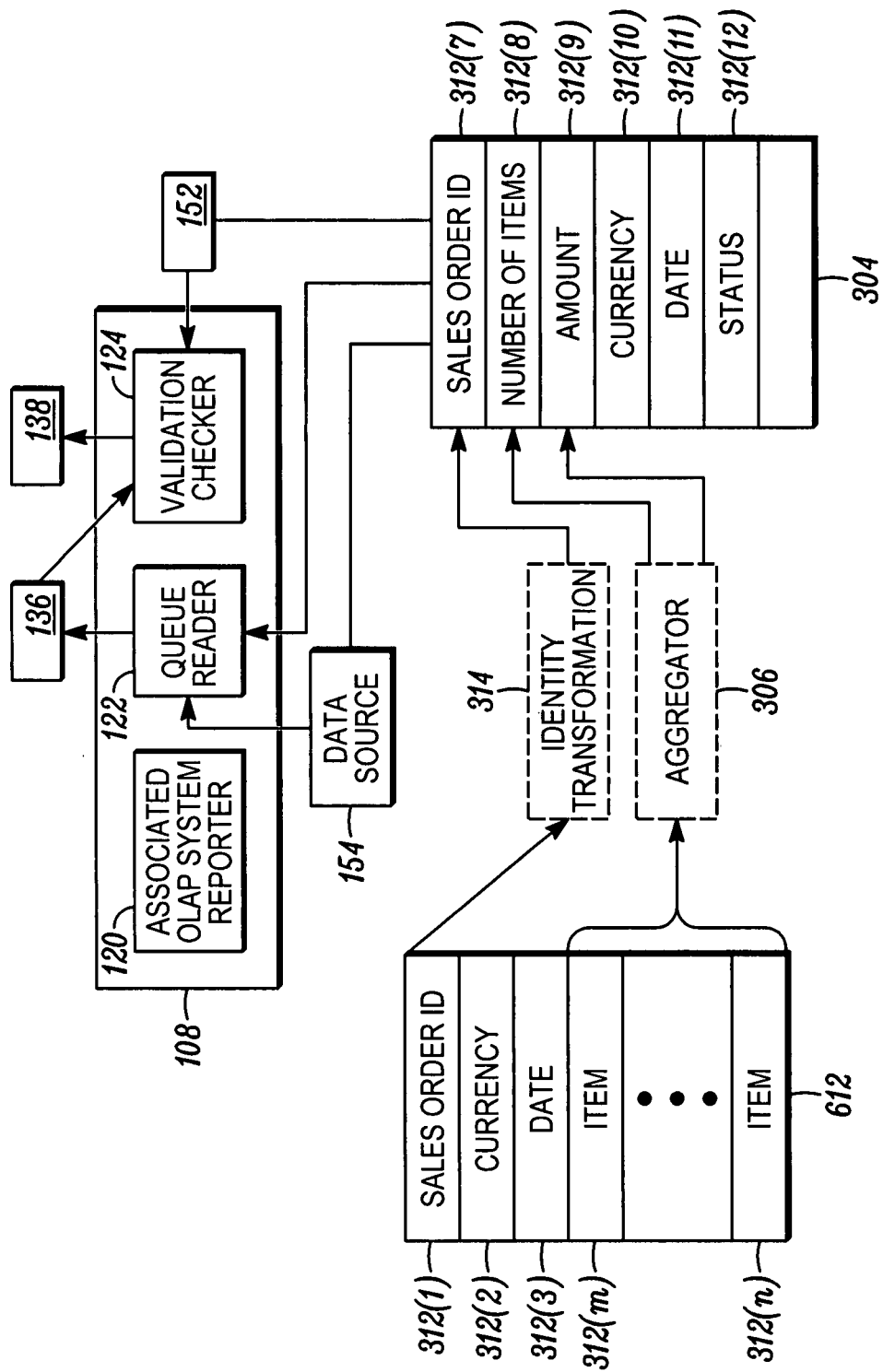
FIG. 6 illustrates an example of an extract structure for a sales order according to an example embodiment.

FIG. 6 illustrates an example of an extract structure for a single sales order record according to one embodiment. Although only a single sales order record (612) is shown in FIG. 6, it should be understood that this example would apply to an arbitrary number of sales order records. A sales order record 612(1) generated by a data extractor may include fields of sales order ID 312(1), currency 312(2), date 312(3), and a plurality of items 312(m)-312(n).

An extract structure 304 may include fields of sales order ID 312(7), number of items 312(8), amount 312(9), currency 312(10), date 312(11) and status 312(12). The fields in extract structure 304 represent transformations performed on the fields in the sales order records 612(1) and 612(2). Thus, for example, sales order IDs 312(1) is processed by identity transformation module 314 to identically generate sales order ID 312(7) in the extract structure 304. Items 312(m)-312(n) are processed by aggregator 306 to generate amount field 312(9) and number of items fields 312(9) in extract structure 304. Number of items field 312(8) may contain the sum of all items in the sales order record 612. Amount field 312(9) may contain the total sum of costs of items in the sales order record 612.

An extraction system 108 may then be employed to check for existence and uniqueness of the sales order ID 312(7) in the extract structure. The queue reader 122 in extraction validation system 108 may read the extract structure 304 to generate data 136. A UUID of the sales order in question may then be provided to validation checker module 124, which reads structured data 136 to report the existence and/or uniqueness of the sales order ID.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the embodiments.

What is claimed is:

1. A system for validating an extraction process from an operational system to an OLAP ("Online Analytics Processing") system, comprising:
    a queue configured to store extracted data that the extraction process has extracted from the operational system, wherein the extracted data in the queue is stored based upon an associated data source; and
    a processor, wherein the processor is adapted to:
        determine at least one queue based upon a received data source;
        read first data from the at least one queue as a function of at least a portion of the selected data source to generate a structured data element that is based upon the selected data source;
        receive at least one identifier associated with the first data for validation of the structured data element;
        determine at least one of an existence and uniqueness of each of the at least one identifier in the structured data element, and
        report a validation result for the structured data element, based upon the existence and uniqueness determination.

2. The system according to claim 1, wherein the data source comprises a function module and an extraction structure.

3. The system according to claim 2, wherein the extraction structure comprises a plurality of structured data fields.

4. The system according to claim 2, wherein the function module is configured to process at least one field generated by a data generator in the operational system to generate at least one transformed field.

5. The system according to claim 4, wherein the function module is configured to cause the aggregation of a plurality of fields into a single field.

6. The system according to claim 4, wherein the function module is configured to execute an identity operation.

7. The system according to claim 4, wherein the function module is configured to cause the filtering of data from at least one field generated by a data generator.

8. A method for validating an extraction process from an operational system to an OLAP ("Online Analytics Processing") system, the method comprising:
    determining at least one queue, stored in a memory, associated with a received data source;
    reading, by an extraction system, first data from the at least one a queue as a function of at least a portion of the selected data source;
    generating, based at least in part upon the read first data, a structured data element that is based upon the selected data source;
    receiving at least one identifier associated with the first data for validation of the structured data element;
    determining, by an extraction validation system, at least one of an existence and uniqueness of each of the at least one identifier in the structured data element, and
    reporting a validation result for the structured data element, based upon the existence and uniqueness determination.

9. The method according to claim 8, wherein determining the selected queue comprises determining a function module and an extraction structure associated with the selected data source.

10. The method according to claim 9, wherein the extraction structure comprises a plurality of structured data fields.

11. The method according to claim 9, wherein the function module is configured to process at least one field generated by a data generator in the operational system to generate at least one transformed field.

12. The method according to claim 11, wherein the function module is configured to cause the aggregation of a plurality of fields into a single field.

13. The method according to claim 11, wherein the function module comprises an identity operation.

14. The method according to claim 11, wherein the function module is configured to cause the filtering of data from at least one field generated by a data generator.

15. A validation interface apparatus configured to validate an extraction process from an operational system to an OLAP ("Online Analytics Processing") system, the validation interface comprising:
    a first function module embodied as code segments for execution by a processor and stored on a non-transitory computer readable medium, the first function module configured to:
        receive, as input, information from a data source,
        read data from a queue, and
        generate, as output, structured data based at least in part upon the data read from the queue and upon the data source;

a second function module embodied as code segments for execution by the processor and stored on the non-transitory computer readable medium, the second function module configured to:
  receive, as input, information from the data source for the operational system, and
  provide an output of at least one queue associated with the data source; and
a third function module embodied as code segments for execution by the processor and stored on the non-transitory computer readable medium, the third function module configured to determine at least one of an existence and a uniqueness of selected data extracted by an extraction system performing the extraction process.

16. The validation interface according to claim 15, further comprising:
  a first interface configured to invoke the first function module, the first interface characterized by a first input parameter specifying the data source;
  a second interface configured to invoke the second function module, the second interface characterized by the first input parameter specifying the data source; and
  a third interface configured to invoke the third function module, the third interface characterized by an input parameter specifying at least one substantially Universal Unique Identifier (UUID) for validation.

17. The validation interface according to claim 15, wherein the data source includes at least one of a function module and an extraction structure.

18. The validation interface according to claim 15, wherein the third function module is configured to check for the existence of at least one data item in a queue associated with the data source.

19. The validation interface according to claim 15, wherein the third function module is configured to check for the uniqueness of at least one data item in a queue associated with the data source.

20. The validation interface according to claim 15, wherein the first function module is further configured to generate a structured table from the data read from the queue, the structured table having a structure corresponding to a metadata for the data source.

* * * * *